US008943048B2

(12) United States Patent
Hao et al.

(10) Patent No.: US 8,943,048 B2
(45) Date of Patent: Jan. 27, 2015

(54) VISUALIZING TIME-DENSE EPISODES

(75) Inventors: Ming C. Hao, Palo Alto, CA (US);
Christian Rohrdantz, Constance (DE);
Umeshwar Dayal, Saratoga, CA (US);
Meichun Hsu, Los Altos Hills, CA (US);
Lars-Erik Haug, Gilroy, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/562,752

(22) Filed: Jul. 31, 2012

(65) Prior Publication Data

US 2014/0040247 A1    Feb. 6, 2014

(51) Int. Cl.
*G06F 17/30*    (2006.01)
(52) U.S. Cl.
USPC .................................. 707/723; 707/E17.082
(58) Field of Classification Search
CPC ................................ G06F 17/30; G06Q 10/00
See application file for complete search history.

(56) References Cited

U.S. PATENT DOCUMENTS

| | | | |
|---|---|---|---|
| 6,411,936 B1 | 6/2002 | Sanders | |
| 2003/0122874 A1 | 7/2003 | Dieberger | |
| 2004/0083127 A1 | 4/2004 | Lunsford | |
| 2006/0026210 A1 | 2/2006 | Vaszary | |
| 2011/0314007 A1 | 12/2011 | Dassa et al. | |
| 2012/0109843 A1 | 5/2012 | Hao | |

OTHER PUBLICATIONS

Krstajic et al. CloudLines: Compact Display of Event Episodes in Multiple Time-Series, IEEE Transactions on Visualization and Computer Graphics, vol. 17, No. 12, Dec. 2011.*
Oelke et al. Visual Opinion Analysis of Customer Feedback Data, IEEE VAST, p. 187-194. IEEE, Oct. 2009.*
www.clarabridge.com, Clarabridge Enterprise, License Version or SaaS Subscription dated on or before Jul. 22, 2010 (3 pages).
Diakopoulos et al., Diamonds in the Rough: Social Media Visual Analytics for Journalistic Inquiry, Rutgers University, School of Communication and Information, Oct. 2010 (8 pages).
www.sas.com, Social Media Monitoring and Analysis, SAS Social Media Analytics, SAS dated on or before Jul. 22, 2010 (4 pages).
Liu et al., SellTrend: Inter-Attribute Visual Analysis of Temporal Transaction Data, IEEE, Nov./Dec. 2009 (8 pages).
Wanner et al., Visual Sentiment Analysis of RSS News Feeds Featuring the US Presidential Election in 2008, Workshop on Visual Interfaces to the Social and the Semantic Web (VISSW2009), IUI2009, Feb. 8, 2009 (8 pages).

* cited by examiner

*Primary Examiner* — Anteneh Girma

(57) ABSTRACT

Attributes in data records are identified. Episodes corresponding to the respective attributes include respective data records. The episodes are scored, where scoring of a particular one of the episodes is based on relative time densities between successive data records of the particular episode. A visualization of at least some of the episodes to provide an alert of time-dense episodes.

20 Claims, 5 Drawing Sheets
(2 of 5 Drawing Sheet(s) Filed in Color)

VISUALIZING TIME-DENSE EPISODES

BACKGROUND

An enterprise can receive various types of information, including customer reviews, sales information, system performance measurements, and so forth. Customer reviews can be submitted online at third-party sites (e.g. web survey sites or social networking sites such as FACEBOOK®, and TWITTER®). Alternatively, reviews can be received directly by an enterprise. Other types of information can be received from other sources. There can potentially be a relatively large number of data records containing various types of information, which can make meaningful analysis of such data difficult and time-consuming.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

Figure 1:
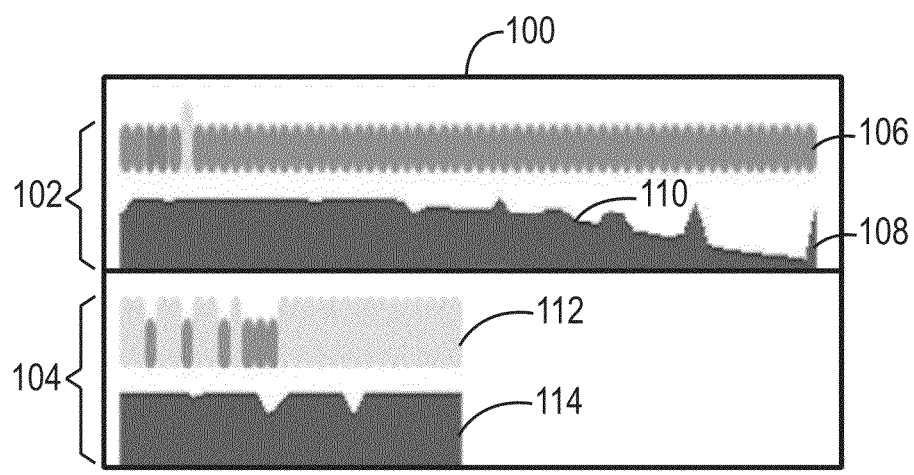
FIG. 1 illustrates an example graphical visualization of episodes, in accordance with some implementations.

An enterprise (e.g. a company, educational organization, government agency, individual, etc.) may collect various types of information from various sources. As examples, such information can include feedback from customers (or more generally "users") that can be used to better understand user sentiment regarding an offering of the enterprise. An offering can include a product or a service provided by the enterprise. A "sentiment" refers to an attitude, opinion, or judgment of a human with respect to the offering. An opinion or other sentiment can be mapped to an attribute (such as an attribute associated with an offering) to indicate a degree of satisfaction or other sentiment with the attribute.

User feedback can be collected from various sources, such as online websites of the enterprise or third-party sites such as travel review websites, product review websites, social networking sites (such as FACEBOOK® and TWITTER®), web survey sites and so forth.

Other types of information that can be collected by an enterprise include measurements from various monitoring devices in a system, such as a network of electronic devices, a data center, a system of storage devices, and so forth. The collected measurements can include performance measurements, such as utilization of computer servers, utilization of storage devices, data rates through communication devices, and so forth. In other examples, collected information can include financial data (e.g. revenue, profit, sales, etc.) of the enterprise, and so forth.

Visualizing relatively large volumes of data records can be complex and time-consuming. A "data record" refers to a unit of data that contains collected information. For example, the data record can include a user review submitted by a particular user, in which the user may have expressed a sentiment with respect to an attribute. In other examples, a data record can include measurement information, such as a measurement of a parameter associated with an electronic device such as a computer, storage device, communication device, and so forth. As other examples, a data record can include financial data or other types of data.

In some examples, to discover interesting collections of events expressed by data records in an incoming data stream, analysts may have to manually scan through a relatively large number of the data records (e.g. thousands or millions of data records), which may be received by a system at a relatively high rate. An "event" can refer to an activity or condition that is expressed by information contained in the incoming stream of data records. A collection of events that is considered interesting according to some criterion can be referred to as an "episode." A manual analysis process established to discover interesting collections of events can be time consuming and error-prone. Moreover, due to the relatively large amount of data that may have to be analyzed, certain information in the incoming data records may be overlooked, which can lead to inaccurate analysis results.

In accordance with some implementations, automated time-based visual analytics techniques or mechanisms are provided for detecting episodes in incoming data records, and for providing visualizations of the detected episodes. In some implementations, the detection of episodes can be performed on a "real-time" basis, where "real-time" detection can refer to detection that is performed in data records as they are received. Real-time detection is compared to detection based on historical data stored in a log or other data collection. In alternative implementations, episode detection can be performed using data records stored in a historical log or other historical data collection.

As noted above, an "episode" can refer to a collection of events (as expressed by corresponding data records) that are considered interesting according to a time density interestingness criterion. In some implementations, events can be considered "interesting" if a relative time distance between the respective data records is less than some threshold, where "time distance" refers to a difference in the time points at which the respective events occurred. In some examples, data records can be associated with timestamps, which indicate respective times at which the data records were created or were received. Events satisfying the time density interestingness criterion can be collected into an episode. An episode can thus include time-dense events, since the events of the episode are those that have time distances to neighboring events that are less than the threshold. Such an episode can also be considered a "time-dense episode."

Multiple episodes can be defined for corresponding multiple attributes that may be present in received data records. An attribute can refer to an item (e.g. product offering or service offering) that may be the subject of review or feedback from users. Alternatively, an attribute can refer to a parameter that is being measured, such as processor utilization, storage utilization, data rate, profit, revenue, user sentiment, and so forth. In further examples, an attribute can refer to a parameter associated with a business operation of an enterprise, such as a financial parameter or some other business-related parameter.

A data record can include one or multiple attributes. For example, a data record containing a product review may contain a first attribute relating to product A, a second attribute relating to an accessory of product A, along with sentiment words that may be expressed with respect to the attributes.

In some implementations, the multiple episodes for respective attributes can be scored, based on one or multiple predefined criteria, as discussed further below. Based on the scoring, a visualization of the episodes can be provided, where graphical portions of the visualization corresponding to the episodes can be ordered in the visualization according to scores produced by the scoring.

The visualization of episodes ordered according to scores produced by the scoring can effectively provide an alert to an analyst (or other user) of time-dense episodes that indicate an issue that may have to be addressed by an enterprise. For example, such issue can include any of the following: negative feedback expressed with respect to an offering of the enterprise; parameter measurements indicating that equipment of the enterprise is operating outside predefined specifications; a financial parameter indicating that the financial performance of the enterprise is outside expectations; and so forth. Using techniques or mechanisms according to some implementations, automatic tracking of a relatively large number of different attributes (on a real-time basis, for example) can be performed to allow analysts to quickly detect issues. This allows an analyst (or other user) to detect an emerging trend and/or problem expressed by an incoming stream of data records. In response to the alert, an action can be taken quickly to address the issue that otherwise may not have been discovered until a later time. The automated analysis of incoming data records and provision of alerts of episodes can be performed automatically without manual analysis of relatively large amounts of data records.

FIG. 1 depicts an example visualization 100 that has graphical portions 102 and 104 that depict respective episodes that have been detected using techniques or mechanisms according to some implementations. The episodes can correspond to different attributes. For example, a first episode can correspond to events relating to an enterprise's website, while a second episode can correspond to events relating to a particular offering (product or service) of the enterprise. Although just two episodes are represented in the visualization 100, it is noted that the visualization 100 can also represent additional episodes in other examples.

In the visualization 100, the horizontal axis represents a timeline. Although events represented by the visualization 100 are plotted in their time order along the timeline, it is noted that the timeline may not represent a linear time axis. In fact, the time axis can be a non-linear time axis with time distortion. However, in other examples, the timeline can represent a linear time axis.

The graphical portion 102 includes an event sequence track 106 and a time density track 108. The event sequence track 106 has a sequence of graphical elements (e.g. in the form of general ovals or rectangles with curved ends) each representing a corresponding event (as expressed by a corresponding data record). The graphical elements in the event sequence track 106 are arranged in time order according to the time points associated with the respective received data records. The graphical elements in the event sequence track 106 are arranged such that they do not overlap each other.

In some implementations, the graphical elements in the event sequence track 106 are assigned different colors corresponding to different values of a respective attribute of the corresponding data record. In the example of FIG. 1, the colors that can be assigned to each of the graphical elements include grey, green, and red. In some examples, the different colors assigned to the graphical elements can represent different sentiments expressed in corresponding user reviews. A green color can indicate a positive sentiment (e.g. a customer is satisfied with the attribute), a red color can indicate a negative sentiment (e.g. a customer is not satisfied with the attribute), while a grey color can indicate a neutral sentiment. In other examples, different colors can represent other measures associated with an attribute. Instead of using color, different visual indicators can be used for the graphical elements of the event sequence track 106, such as different grey scales, different patterns, and so forth.

The time density track 108 indicates the inter-event temporal information between events of the event sequence track 106. The time density track 108 has a curve 110 with a height that varies at different points along the curve 110. The height of a point along the curve 110 represents a relative time distance between a corresponding pair of two successive events in the event sequence track 106 (where the height of the curve is derived from the time distance between the corresponding pair of two successive events relative to a moving average, or other aggregate, of time distances up to that point). A greater height of the curve 110 indicates a smaller relative time distance between the corresponding pair of successive events, while a lower height of the curve 110 represents a larger relative time distance between the corresponding pair of successive events. More generally, the height at time point i on the curve 110 of the time density track 108 represents the time distance between event i and event i−1 (at time points i and i−1, respectively) in the event sequence track 106, in relation to a moving average (or other aggregate) of time distances up to time point i−1.

The graphical portion 104 similarly includes an event sequence track 112 and a time density track 114. The order of the graphical portions 102 and 104 appearing in the visualization 100 can be based on scores assigned to the episodes, using scoring according to one or multiple predefined criteria (discussed further below).

Figure 2:
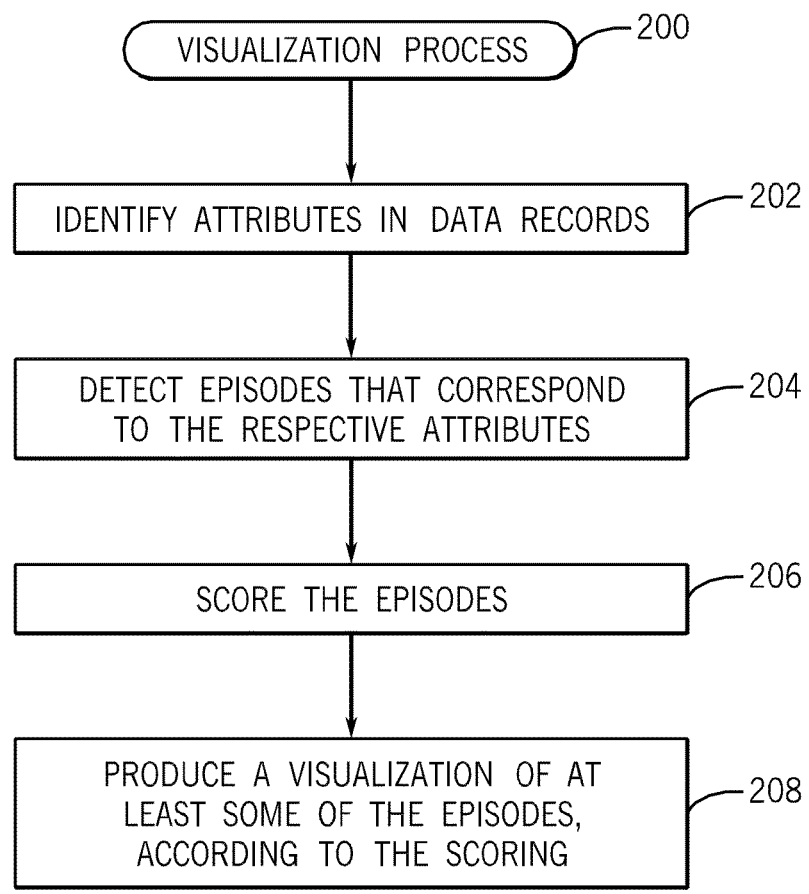
FIG. 2 is a flow diagram of a visualization process according to some implementations.

FIG. 2 is a flow diagram of a visualization process 200 according to some implementations. The visualization process 200 identifies (at 202) attributes in data records. The visualization process 200 detects (at 204) episodes that correspond to the respective attributes, where each of the episodes includes a respective collection of events represented by the data records that relate to a corresponding attribute. As noted above, events collected into each of the episodes are those that satisfy a time density interestingness criterion.

The visualization process 200 scores (at 206) the episodes, where the scoring of a particular one of the episodes is based on one or multiple criteria. In some implementations, the scoring can be based on relative time densities between successive data records of the particular episode. Additionally, the scoring can be based on an aggregate time distance (e.g. average time distance, maximum time distance, median time distance, weighted sum of the time distance, etc.) among the data records of the particular episode.

In further implementations, the scoring can also be based on negativity of sentiment expressed in the data records of the particular episode. In yet further implementations, the scoring can also be based on content coherence among the data records of the particular episode, where the content coherence is based on strength of association of terms with the data records of the particular episode.

More generally, the scoring (at 206) can be based on any combination of the foregoing criteria, including: relative time densities between successive data records of an episode, an aggregate time distance among the data records of an episode, negativity of sentiment expressed in the data records of an episode, and content coherence among the data records of an episode. In further implementations, other or additional criteria can be used for the scoring.

Note that scoring of episodes also allows for the capability to identify an episode that includes an accumulation of events that may have occurred randomly. Such a random accumulation of events, which would have a lower score, is not meaningful for further analysis. More generally, the scoring allows for more interesting episodes to be brought to the attention of a user, or to be subject to further analysis.

The visualization process then produces (at 208) a visualization of at least some of the episodes. The visualization of at least some of the episodes can include graphical portions corresponding to the visualized episodes, where the graphical portions (e.g. 102 and 104 in FIG. 1) are ordered according to the scores produced by the scoring (at 206). By ordering the graphical portions, those episodes that are of greater interest or importance may be presented more prominently, such as in an upper portion of the visualization. Also, the scores produced by the scoring can be used to identify which episodes to represent in the visualization, and which episodes to leave off of the visualization.

In some examples, techniques or mechanisms according to some implementations are able to detect relevant episodes independent from an absolute frequency of any particular attribute. Episode detection can be achieved for infrequent and frequent attributes.

Figure 3:
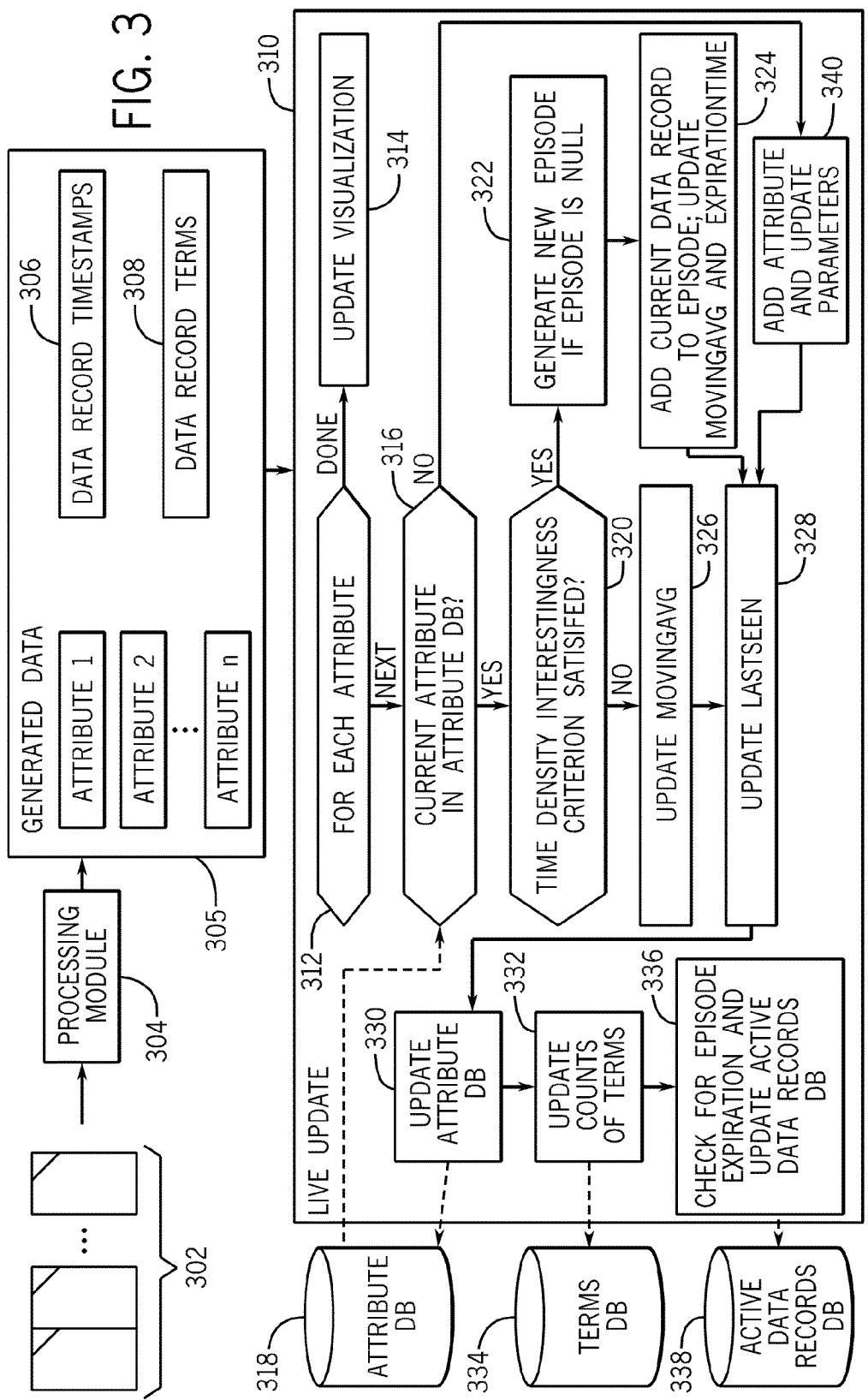
FIG. 3 is a flow diagram of an episode detection process, according to some implementations.

FIG. 3 is a flow diagram of an episode detection process for detecting episodes and identifying data records associated with corresponding episodes. The episode detection process receives a stream of data records 302, which can be processed by a processing module 304. In some examples, the processing module 304 can be a natural language processing module that can parse a data record to identify sentences (or structures), and words within sentences. Also, the processing module 304 can perform part-of-speech tagging of words in a data record, to identify the corresponding part of speech (e.g. noun, verb, adverb, adjective, etc.). Such processing allows the processing module 304 to identify words that correspond to attributes, words that correspond to sentiments, and other words. More generally, the processing module 304 is able to extract terms from the data records, where the terms include attributes and other terms, such as content-bearing terms relating to sentiment expressed with respect to attributes, content-bearing terms providing measurement values for attributes, and so forth. The processing module 304 produces generated data 305, which includes various attributes (e.g. attributes 1, 2, ..., n) identified in the data records. Note that a data record can include one or multiple data attributes, such that n≥1.

The generated data 305 can also include timestamps 306 associated with the data records, along with content-bearing terms 308 (other than attributes) in the data records. Each instance of the generated data 305 can correspond to a particular data record, such that multiple instances of the generated data 305 would be produced for the multiple data records 302 of the incoming stream. In other examples, an instance of the generated data 305 can include attributes, timestamps, and content-bearing terms associated with multiple data records.

The production of the generated data 305 constitutes extraction of meta-information (including the attributes, timestamps, terms, etc.) associated with the data records 302. The meta-information extraction can be performed in real-time (in other words, the extraction is performed as the data records are received).

FIG. 3 also shows a live update procedure 310, which can be re-iterated for the different attributes of a given data record that is the subject of a current processing. The data record that is currently being processed by the live update procedure 310 is referred to as a "current data record" in the ensuing discussion.

For the current data record, block 312 determines whether an attribute of the current data record is to be processed. When processing of all attribute(s) in the current data record is completed (the "done" branch from block 312), a visualization (such as the visualization 100 of FIG. 1) is updated (at 314) by the live update procedure 310. On the other hand, so long as there is a further attribute to be processed (the "next" branch from the block 312), the live update procedure 310 determines (at 316) whether the current attribute (the attribute that is currently being processed) is in an attribute database 318.

If the current attribute is already in the attribute database 318, that means that the current attribute had appeared in a previous data record that was processed by the live update procedure 310. The attribute database 318 can further include other information associated with each attribute (discussed further below).

If the current attribute is already in the attribute database 318, then the live update procedure 310 determines (at 320) if a time density interestingness criterion is satisfied. The interestingness criterion relates to a time distance between successive data records that is less than some predefined threshold, which indicates that the current data record is an interesting data record. More specifically, the time density interestingness criterion is satisfied if the timestamp associated with the current data record satisfies the following relationship:

$$\text{TimeStamp} - \text{LastSeen} < \text{MovingAvg}. \quad \text{(Eq. 1)}$$

In the foregoing, the parameter TimeStamp represents the timestamp of the current data record, the parameter LastSeen represents a previous time point when the current attribute was last detected, and the attribute MovingAvg represents a moving average that is based on an average time distance among data records that contain the attribute. The specific formula for computing MovingAvg is discussed further below.

Instead of a moving average (MovingAvg) of time distances, other implementations can employ another type of aggregate time distance among data records relating to a particular attribute, such as a maximum time distance (maximum time distance from among time distances between respective pairs of events), median time distance, and so forth.

If the relationship set forth above in Eq. 1 is true, then the live update procedure 310 proceeds to update the episode that corresponds to the current attribute. If the episode is null, which means that the episode does not yet exist, then a new episode is generated (at 322). Next, the live update procedure 310 adds (at 324) the current data record to the episode. Note that an episode can be represented by Episode, which is a data structure that can contain representations of data records that have been added to the data structure. The data records added to Episode represent the events that are part of the episode.

The live update procedure 310 can also perform the following additional computations (at 324): update MovingAvg using the time distance between TimeStamp and LastSeen; and compute ExpirationTime=TimeStamp+MovingAvg, where ExpirationTime represents an expiration time at which the episode is to be removed or discarded, since the episode is considered to have expired. Effectively, an episode expires if a data record is not received that contains the corresponding attribute within a time interval represented by MovingAvg.

In some examples, the moving average for iteration i (a current iteration performed by the live update procedure 310 of FIG. 3) can be computed as follows:

$$MovingAvg(i) = MovingAvg(i-1)*(1-a) + (TimeStamp(i) - TimeStamp(i-1))*a,$$

where a is a parameter that can be pre-specified. For example, the parameter a can be a fractional value, such as 0.1 or some other example fractional value.

The parameter a specifies that the predefined percentage of the influence will come from the time distance that the current data record i has from the previous data record i−1. The remainder of the influence 1−a results from the old moving average calculated at iteration i−1. Thus, the influence from past moving averages decreases exponentially.

In other examples, other ways of computing the moving average in iteration i can be used.

If the live update procedure 310 determines (at 320) that the time density interestingness criterion is not satisfied, then the live update procedure 310 does not update the episode (as performed at 324), but instead updates (at 326) the moving average, MovingAvg. From either task 324 or task 326, the live update procedure 310 updates (at 328) the parameter LastSeen, by setting it equal to TimeStamp. This effectively updates the time that the current attribute was last seen to the timestamp of the current data record.

Next the live update procedure 310 updates (at 330) the attribute database 318. For example, the attribute database 318 can be updated with the following updated parameters associated with the current attribute: LastSeen, MovingAvg, Episode, ExpirationDate. Note that in some examples, the attribute database 318 can store the foregoing parameters with each of the attributes that have been encountered by the live update procedure 310.

Next, a count of a number of each of the terms in the current data record is updated (at 332). The updated counts are provided to a terms database 334. For each term in the current data record, the corresponding count is updated.

Next, the live update procedure 310 checks (at 336) for expiration of episodes. If an episode has expired (the episode has not been updated by its expiration time as represented by ExpirationTime), then the episode can be discarded. Any data records included in the expired episode that does not appear in another episode can be marked as inactive data records. A data record is considered active if it is contained in at least one episode. If data records are marked inactive due to expiration of an episode, the active data records database 338 is updated. Information contained in the active data records database 338 can include the following for each active data record, in accordance with some examples: full text of the data record, a timestamp, and various content-bearing terms other than attributes. A given data record is added to the active data records database 338 if the given data record is contained in at least one episode.

The foregoing has discussed tasks performed in response to the determination (at 316) by the live update procedure 310 that the current attribute is in the attribute database 318. If it is determined (at 316) that the current attribute is not in the attribute database 318, then the live update procedure 310 adds (at 340) the current attribute, and updates various parameters. For example, MovingAvg is updated as follows:

$$MovingAvg = TimeStamp - Begin,$$

where Begin is a time point at which an incoming stream (e.g. stream of data records 302) started. Effectively, the moving average MovingAvg is initialized to TimeStamp (the timestamp of the current data record) less the time point (Begin) at which the data record stream started. Additionally, a new episode (Episode) can be produced, and the current data record is added to the episode. The expiration time is also updated as discussed above.

From task 340, the live update procedure 310 then proceeds to tasks 328, 330, 332, and 336 as discussed above.

As noted above, the scoring of episodes (at 206 in FIG. 2) performed according to some implementations can be based on various criteria. One such criterion includes relative time densities between successive data records of a particular episode. As discussed above, FIG. 1 depicts a curve 110 in the time density track 108 (or 114) that depicts how densely successive events occur at respective time points. A greater height of the curve 110 indicates that the corresponding pair of successive events are closer in time.

The relative time densities between successive data records can be normalized by a moving average time density of data records in the particular episode. This moving average time density can be represented by the average height of the curve 110 of FIG. 1, and provides an indication of how densely the data records occur in time, on average, for the corresponding episode. In different examples, instead of using a moving average time density, another type of aggregate time density can be used, such as a maximum time density, median time density, and so forth.

Episode length can also be considered in determining a density-based score. The episode length refers to a length of the episode, which is proportional to the number of events in the episode. A longer episode length, which means that the episode has a larger number of events, is less likely to be due to a random effect. The relative time density and episode length can be integrated into computing the density-based score, according to the following:

$$\text{density\_sum}(P) = \sum_{i=1}^{|x \in P|} \left(1 - \frac{t_i - t_{i-1}}{MovingAvg}\right),$$

where $t_i - t_{i-1}$ represents a relative time distance of a data record x (at time $t_i$) to the preceding data record (at time $t_{i-1}$) within an episode P. The time density, $t_i - t_{i-1}$, is normalized with the moving average time distance, MovingAvg among data records in the particular episode. Note that $|\{x \in P\}|$ in the foregoing equation represents the length of the episode P, in terms of the number of data records in the episode P. Based on the foregoing equation, the shorter the relative time distance between two data records, the higher their time density value. Moreover, the longer the episode, the more summands are considered.

The density-based score is represented by density_sum(P).

Another criterion for scoring an episode is a sensitive-negativity criterion. A larger number of negative data records in an episode may indicate that the episode may relate to a more important issue, such as a problem associated with an offering, and thus can be scored higher. The sentiment S(x) regarding attribute F in each individual data record x is used to obtain the sentiment-negativity score for episode P, such as according to the following:

$$\text{sentiment-negativity}(P) = \sum_{x \in P} -S(x).$$

The foregoing sums the sentiment values, S(x), of all data records in the episode P. Each sentiment value, S(x), is multiplied by −1 in the foregoing equation to obtain a positive value if there are a larger number of negative sentiment data records than positive sentiment data records in the episode.

Another criterion that is used for scoring an episode is a content-coherence criterion. There may be accumulations of negative comments on an attribute that may not refer to the same issue. On the other hand, a particular episode is of more interest where all data records in the particular episode apparently report about the same issue, namely that they refer to the same attribute in similar context. A simple but relatively effective heuristic is provided to take this content coherence into account. For every potentially content-bearing term T (adjective, noun, verb, etc.) in a candidate episode P, an evaluation can be determined of how strongly this term T is associated with the data records (DOCs) of the episode P. In some examples, to measure the significance of an association, a log-likelihood ratio test can be used, which operates on a contingency table, such as the table below:

|       | DOC ∈ P | DOC ∉ P |
|-------|---------|---------|
| T ∈ DOC | A | B |
| T ∉ DOC | C | D |

The first column of the foregoing table refers to documents (DOCs) that are contained in the given episode (P). The second column of the foregoing table refers to the entire document collection apart from the given episode (P). In the foregoing table, A represents a number of documents (DOCs) of episode P that contain the term T, B represents the number of documents (DOCs) not in episode P that contain the term T, C represents the number of documents (DOCs) of episode P that do not contain the term T, and D represents the number of documents (DOCs) not in episode P that do not contain the term T.

The log-likelihood ratio test can be used to measure the strength of word co-locations. An example of an log-likelihood ratio is computed as follows:

$$\text{log-likelihood ratio} = A \log\left(\frac{A/(A+B)}{(A+C)/(N)}\right) +$$

$$B \log\left(\frac{B/(A+B)}{(B+D)/(N)}\right) + C \log\left(\frac{C/(C+D)}{(A+C)/(N)}\right) + D \log\left(\frac{D/(C+D)}{(B+D)/(N)}\right),$$

with $N = A + B + C + D$.

Generally, the log-likelihood ratio as expressed above is higher when the term T occurs statistically more frequently in data records of an episode than in the whole data record stream so far, since that is an indication that the term T is more specific to this episode. In some examples, a top number M (e.g. 10 or other number) of associated terms (those terms associated with the top M log-likelihood ratio values as computed above, are summed to produce the content-coherency score, content-coherence(P), for episode P. This sum can be higher for an episode that has a number of terms occurring significantly more likely within the data records of the episode than in other data records. An example computation of the content-coherency score:

$$\text{content-coherence}(P) = \sum_{i=1}^{M} \text{log-likelihood ratio}(T_i, P),$$

where log-likelihood ratio($T_i$, P)≥log-likelihood ratio($T_{i+1}$, P).

The various scores (time density score, sentiment-negativity score, and content-coherence score) computed above can be aggregated to provide an overall score for a particular episode. The aggregation can be a product or sum of the foregoing scores for example, where the product or sum can be a weighted product or weighted sum where each of the foregoing scores is weighted by a corresponding predefined weight coefficient, such as according to the following:

score(P)=α density_sum(P)·β sentiment_negativity(P)·γ context_coherence(P)

In other examples, other aggregates of the foregoing scores can be computed to derive the overall score for the particular episode (computed at 206 in FIG. 2, for example). In other implementations, the overall score of an episode can be based on aggregating a subset of the foregoing scores, or just on an individual one of the foregoing scores.

Figure 4:
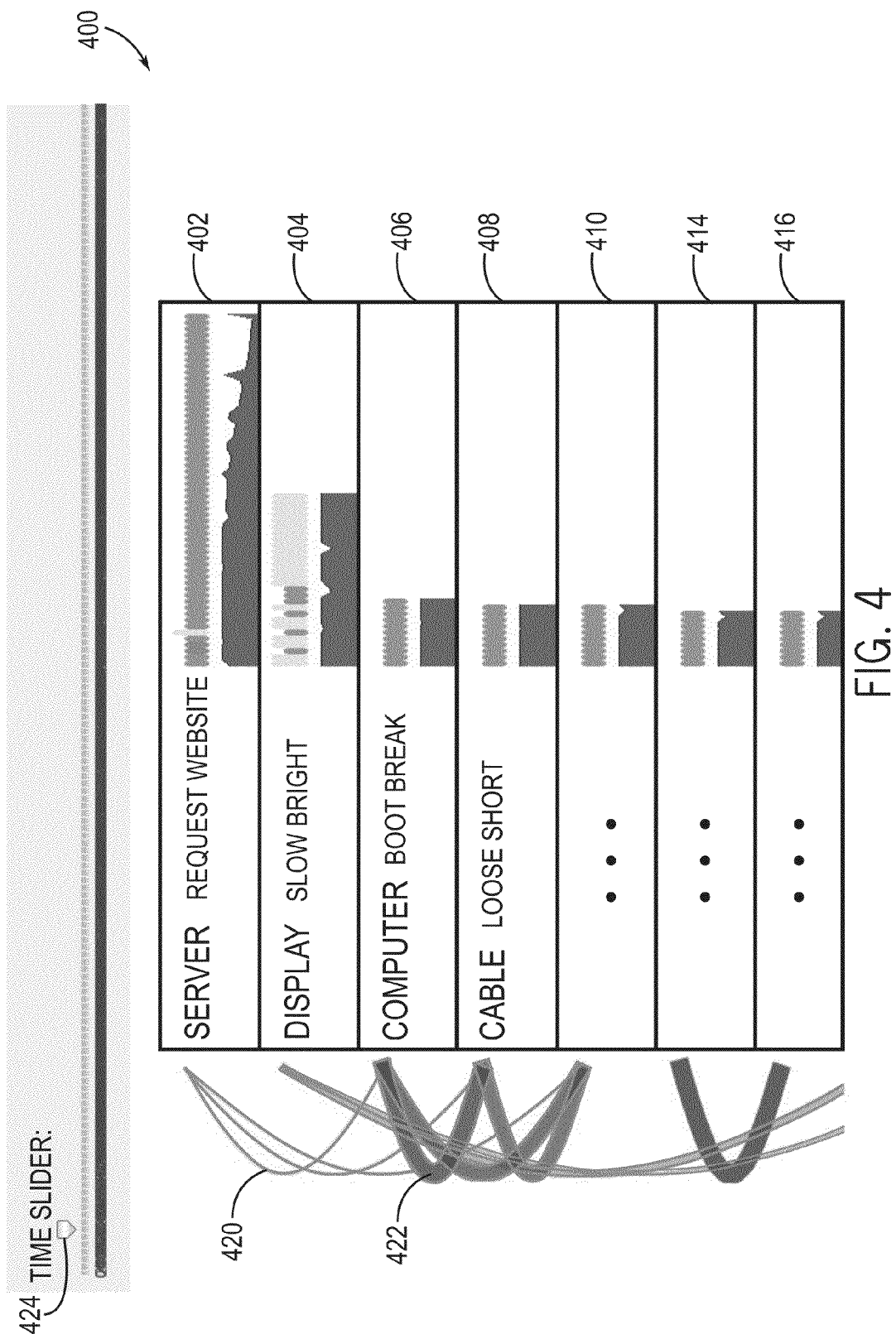
FIG. 4 is an example graphical visualization of episodes, according to further implementations.

FIG. 4 depicts a visualization 400 according to further examples. The visualization 400 has various graphical portions 402, 404, 406, 408, 410, 414, and 416 that represent respective episodes. As noted above, the order of the graphical portions can be based on respective scores of the represented episodes. In each graphical portion, the first term that appears is a label that represents the attribute corresponding to the respective episode. Thus, for example, in graphical portion 402, "SERVER" is a label of the attribute corresponding to the episode represented by the graphical portion 402. The other terms appearing in smaller font in each graphical portion are those that are most strongly associated with the data records of the episode, as indicated by the respective log-likelihood ratios of such other terms. For example, in graphical portion 402, "REQUEST" and "WEBSITE" are examples of such other terms with relatively high log-likelihood ratios. Each graphical portion can contain L (L≥1) other terms with the highest log-likelihood ratios for the corresponding episode.

As further depicted in FIG. 4, arcs (including arcs 420 and 422) (or more generally, "links") can be drawn between different graphical portions, where each arc provides an indication of relative similarity between the two episodes represented by the graphical portions connected by the arc. The arcs can have two different colors (e.g. green and blue) to represent different types of similarities. A thicker arc indicates greater similarity between episodes than a thinner arc.

Each blue arc (e.g. arc 422) represents co-occurrence similarity, while each green arc (e.g. 420) represents content-based similarity. An arc is drawn between graphical portions for two episodes if their relative similarity (co-occurrence similarity or content-based similarity) is greater than some predefined threshold value.

In the approach discussed above, where individual attributes can be monitored separately, two (or more) different attributes may refer to the same issue. This can be due to two different causes. First, both of the two attributes describe the same issue and the attributes co-occur in the same documents (this is considered co-occurrence similarity). Second, the two attributes are synonyms and either one of them can be used to describe the issue (this is considered content-based similarity). The visualization 400 allows notification of such similarities between attributes of respective episodes are closely. This allows an analyst to complement the analysis of one of the episodes with information from the other related episode, based on the similarity arcs appearing in the visualization.

In some implementations, to detect closely related event episodes, their pairwise similarities can be evaluated. It may not be feasible to do this for every candidate episode in real-time—for computational efficiency, the similarity analysis can be applied to some predefined number (k) of top-scored episodes (scored as discussed further above) at each point in time. Whenever a new episode enters the top k episodes its similarity to all other episodes among the top k can be calculated.

In some implementations, to determine the co-occurrence-based similarity between two episodes $E_1$ and $E_2$, the following index can be computed. Taking the two sets of data records belonging to episodes $E_1$ and $E_2$, the size of the intersection of both sets is divided by the size of the union to determine their relative similarity, record_sim($E_1$, $E_2$):

$$\text{record\_sim}(E_1, E_2) = \frac{|\{D: D \in E_1 \wedge D \in E_2\}|}{|\{D: D \in E_1 \vee D \in E_2\}|}$$

The case of maximal similarity is that both sets are identical, in which case the record_sim($E_1$, $E_2$) will be 1. In the case of maximal dissimilarity, where both sets are completely disjoint, the record_sim($E_1$, $E_2$) will be 0. In other cases, the resulting value will be between 0 and 1. The closer the document similarity to 1, the higher the occurrence of common documents in the two episodes. In the example of FIG. 4, a relatively high co-occurrence similarity exists between episodes corresponding to "COMPUTER" and "CABLE" (as indicated by arc 422). Note that the thickness of the arc 422 is based on the value of record_sim($E_1$, $E_2$)—a higher value of record_sim($E_1$, $E_2$) results in a thicker arc.

To determine the co-occurrence-based similarity between two event episodes $E_1$ and $E_2$, a similar index can be computed. However, instead of considering the proportion of common data records, the proportion of content words the data records of two episodes share is determined. Any noun, verb, and adjective can be considered to be a content word. If at least two data records of an episode E contain a content word CW, it can be considered that CW∈E, and the index is computed by taking the two sets of data records belonging to $E_1$ and $E_2$ and dividing the size of the intersection of both sets by the size of the union:

$$\text{content\_sim}(E_1, E_2) = \frac{|\{CW: CW \in E_1 \wedge CW \in E_2\}|}{|\{CW: CW \in E_1 \vee CW \in E_2\}|}$$

The value for content_sim($E_1$, $E_2$) will again lie in the interval between 0 and 1. In some cases, the values of content_sim($E_1$, $E_2$) are lower than for record_sim($E_1$, $E_2$).

Figure 5:
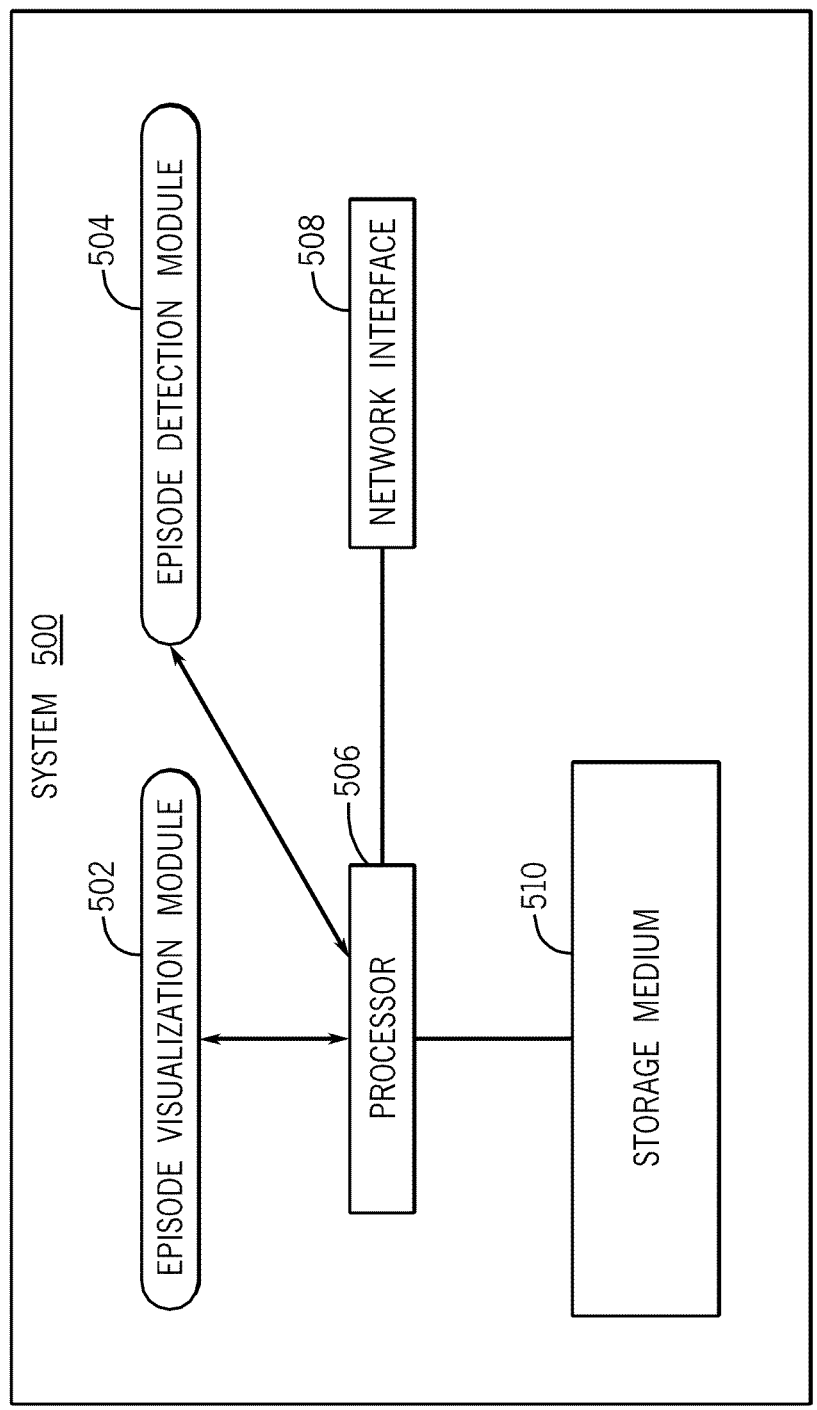
FIG. 5 is a block diagram of an example system incorporating some implementations.

FIG. 5 is a block diagram of a system 500 according to some implementations. The system 500 can include an episode visualization module 502, which can perform the tasks of FIG. 2, for example. The system 500 can also include an episode detection module 504, which can perform the tasks of FIG. 3, for example.

The modules 502 and 504 can include machine-readable instructions executable on a processor or processors 506. A processor can include a microprocessor, microcontroller, processor module or subsystem, programmable integrated circuit, programmable gate array, or another control or computing device.

The processor(s) 506 can be connected to a network interface 508, which allows the system 500 to communicate over a network. The processor(s) 506 can be connected to a storage medium (or storage media) 510, which can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   identifying, by a system having a processor, attributes in data records;
   detecting, by the system, episodes corresponding to the respective attributes, wherein each of the episodes includes a respective collection of events represented by the data records that relate to a corresponding attribute;
   scoring, by the system, the episodes, where scoring of a particular one of the episodes is based on relative time densities between successive data records of the particular episode;
   producing, by the system, a visualization of at least some of the episodes to provide an alert of time-dense episodes, the visualization including graphical portions representing the respective at least some of the episodes, each of the graphical portions including graphical elements representing respective events in a corresponding one of the episodes; and
   ordering, by the system, the graphical portions in the visualization according to scores calculated by the scoring of the episodes, the scores including a score calculated by the scoring of the particular episode.

2. The method of claim 1, wherein detecting the episodes comprises performing real-time detection of the episodes.

3. The method of claim 1, wherein the scoring of the particular episode is further based on an aggregate time distance among the data records of the particular episode, where the aggregate time distance is used to normalize the relative time densities.

4. The method of claim 3, further comprising:
adding a given data record containing a respective attribute to the particular episode in response to the given data record having a time distance from a previous data record containing the respective attribute by less than the aggregate time distance.

5. The method of claim 1, wherein the scoring of the particular episode is further based on negativity of sentiment expressed in the data records of the particular episode.

6. The method of claim 1, wherein the scoring of the particular episode is further based on content coherence among the data records of the particular episode, where the content coherence is based on strength of association of terms with the data records of the particular episode.

7. The method of claim 1, wherein the graphical portions include respective time-density tracks to depict relative time densities between data records of corresponding ones of the episodes.

8. The method of claim 7, wherein the graphical portions further include sequences of the graphical elements that represent respective events of corresponding ones of the episodes, where each of the graphical elements has a visual indicator assigned based on a measure assigned to an attribute in the corresponding data record.

9. The method of claim 8, wherein the visual indicator for a respective one of the graphical elements is selected from among a plurality of colors that correspond to different values of the measure.

10. The method of claim 1, wherein the visualization further includes links between pairs of the graphical portions, at least one of the links indicating co-occurrence similarity, the co-occurrence similarity based on co-occurrence of attributes in the data records.

11. An article comprising at least one non-transitory machine-readable storage medium storing instructions that upon execution cause a system to:
identify attributes in incoming data records;
add data records to episodes that correspond to respective ones of the attributes, where adding a given one of the data records to a particular one of the episodes is in response to determining that the given data record has a time distance to a previous data record of less than an aggregate time distance among data records of the particular episode;
score the episodes, where the particular episode is scored based on relative time densities between successive data records of the particular episode and on the aggregate time distance; and
produce a visualization of at least some of the episodes based on the scoring to provide an alert of time-dense episodes.

12. The article of claim 11, wherein the instructions upon execution cause the system to further order graphical portions of the visualization representing respective ones of the at least some episodes according to scores produced by the scoring, wherein each of the graphical portions includes graphical elements representing data records of a corresponding one of the episodes, and each of the scores is based on relative time densities between successive data records of a corresponding one of the episodes.

13. The article of claim 12, wherein each of the graphical portions includes a label of the corresponding one of attributes, and a time-density graph to depict relative time densities between data records of the corresponding episode.

14. The article of claim 12, wherein the scores are further based on negativity of sentiment expressed in the data records of the respective episodes.

15. The article of claim 12, wherein the scores are further based on content coherence among the data records of the respective episodes, where the content coherence is based on strength of association of terms with the data records of each respective episode.

16. The article of claim 11, wherein the instructions upon execution cause the system to:
add a link between a graphical portion for a first of the at least some episodes and a graphical portion for a second of the at least some episodes, wherein the link indicates relative similarity between the first and second episodes.

17. The article of claim 16, wherein the relative similarity includes co-occurrence similarity that indicates that multiple attributes describe a common issue as the multiple attributes co-occur in the same data records.

18. The article of claim 16, wherein the relative similarity includes content-based similarity that indicates that multiple attributes are used synonymously to describe a common issue.

19. A system comprising:
at least one processor to:
identify attributes in data records;
detect episodes corresponding to the respective attributes, wherein each of the episodes includes a respective collection of events represented by the data records that relate to a corresponding attribute;
score the episodes, where scoring of a particular one of the episodes is based on relative time densities between successive data records of the particular episode;
produce a visualization of at least some of the episodes to provide an alert of time-dense episodes, the visualization including graphical portions representing the respective at least some of the episodes, each of the graphical portions including graphical elements representing respective events in a corresponding one of the episodes; and
ordering, by the system, the graphical portions in the visualization according to scores calculated by the scoring of the episodes, the scores including a score calculated by the scoring of the particular episode.

20. The system of claim 19, wherein the at least one processor is to further add a given data record containing a respective attribute to the particular episode in response to the given data record having a time distance from a previous data record containing the respective attribute by less than the aggregate time distance.

* * * * *